Figure 1:
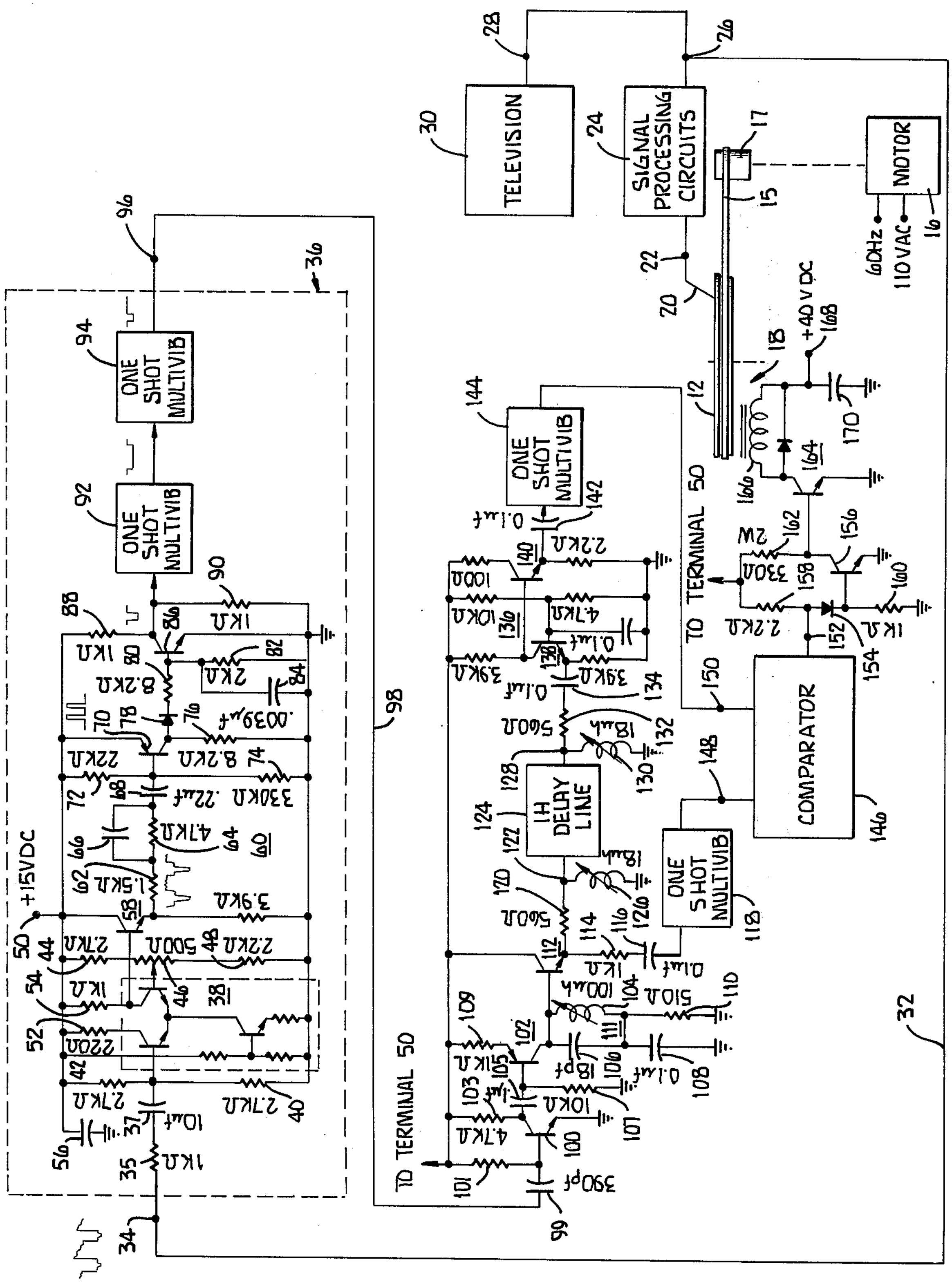

United States Patent [19]

Boltz, Jr.

[11] 3,940,556

[45] Feb. 24, 1976

[54] TIMING ERROR DETECTING AND SPEED CONTROL SYSTEM

[75] Inventor: Charles D. Boltz, Jr., Greenwood, Ind.

[73] Assignee: RCA Corporation, New York, N.Y.

[22] Filed: June 12, 1974

[21] Appl. No.: 478,653

Related U.S. Application Data

[63] Continuation of Ser. No. 284,511, Aug. 29, 1972.

[52] U.S. Cl. ..... 178/6.6 R; 178/6.6 DD; 178/6.6 P; 179/100.1 S; 179/100.4 E; 318/302; 358/8; 360/73

[51] Int. Cl.[2].. H04N 5/76; G11B 17/00; H02K 7/10

[58] Field of Search......... 178/6.6 R, 6.6 P, 6.6 DD, 178/6.6 TC; 274/1 D, 1 E, 1 F; 179/100.1 S, 100.4 D, 100.4 E; 318/302; 360/70, 73; 358/4, 8, 9

[56] References Cited

UNITED STATES PATENTS

| | | | |
|---|---|---|---|
| 2,334,510 | 11/1943 | Roberts | 179/100.4 E |
| 3,046,463 | 7/1962 | Johnson | 318/302 |
| 3,424,861 | 1/1969 | Delvaux | 178/6.6 TC |
| 3,461,226 | 8/1969 | Carnt | 358/8 |
| 3,504,111 | 3/1970 | Sumida | 358/8 |
| 3,505,466 | 4/1970 | Prochnow | 360/70 |
| 3,560,635 | 2/1971 | Bruch | 358/9 |

FOREIGN PATENTS OR APPLICATIONS

| | | | |
|---|---|---|---|
| 1,128,882 | 10/1968 | United Kingdom | 360/73 |

*Primary Examiner*—Raymond F. Cardillo, Jr.
*Attorney, Agent, or Firm*—Eugene M. Whitacre; William H. Meagher

[57] ABSTRACT

A timing error detecting and speed control system is provided for a video playback system. Signal information which recurs at the horizontal line scanning rate of a prerecorded video signal is derived during playback of a record medium. The signal information is delayed for a period of time which corresponds to the normal duration of one horizontal line of the video signal. An error signal is generated by a comparison of the delayed and undelayed signal information. The error signal is utilized to control a drive mechanism for the playback system. The drive mechanism is adjusted to control the speed of the relative motion between the record medium and a pickup device to reduce timing errors in the recovered video signal.

2 Claims, 2 Drawing Figures

Fig. I

TIMING ERROR DETECTING AND SPEED CONTROL SYSTEM

This is a continuation of Ser. No. 284,511 filed August 29, 1972.

The present invention pertains to video playback systems and more particularly to a timing error detecting and speed control system for a video playback system.

In video playback systems, prerecorded video information is recovered by establishing relative motion between a record medium and a pickup device. Examples of such video playback systems are video tape players where a magnetic tape is moved across magnetic pickup heads and video disc players wherein a pickup engages the groove of a rotating disc record. In systems of this type, it has been recognized that a predetermined speed relationship must be maintained between the record medium and pickup device for proper operation.

The predetermined speed relationship between the record medium and pickup device is necessary to assure that the recovered horizontal and vertical synchronizing information is stable and of a frequency which is within the lockup range of the horizontal and vertical deflection circuits of the television receiver to which the video playback system is connected. Moreover, where the recorded information is a color television signal with the chrominance information recorded as a modulated carrier signal which requires processing by the playback system, the recovered signal must also be stable and of a frequency within the lockup range of the playback system color processing circuits.

It has been recognized that the predetermined speed relationship can be maintained between the record medium and pickup device through a speed control system for the video playback system record medium drive motor. One suitable speed control system is disclosed in a U.S. Pat. application Ser. No. 284,510. filed on Aug. 29, 1972 and now U.S. Pat. No. 3,829,612 for Billy Wesley Beyers and entitled, "SPEED CONTROL SYSTEM." The application is assigned to RCA Corporation. In such speed control systems, however, it is necessary to determine the speed relationship between the record medium and the pickup device. Specifically, it is necessary to provide information to the speed control system concerning the direction and extent of any changes from the predetermined speed relationship between the record medium and pickup device.

When the information concerning the direction and extent of deviation in the speed relationship between the record medium and pickup device is based upon sensing the speed of the moving parts of the playback system, the information provided to the control system is not necessarily directly related to the problem of maintaining the stability and frequency of the recovered television signal within a desired lockup range of the signal processing circuits. Thus, for example, improper operation of the playback system due to slippage between the record medium and drive mechanism would not be sensed, nor corrected.

Systems have been proposed where a timing signal is recorded along with an information signal on a record medium. In such systems, during playback, the recovered timing signal is utilized to provide information concerning the speed relationship between the record medium and pickup device. An example of a system of this type is shown in U.S. Pat. No. 2,913,652 granted to Greenberg et al. Again, the information provided to the control system is not directly related to the problem of maintaining the stability and frequency of the recovered television signal within a desired lockup range of the signal processing circuits. As a consequence, if the recorded timing signal is not precisely related to the information record, or if a timing distortion is introduced between the timing and information signals during playback, as for example by a bending or stretching of the record medium, the timing error in the recovered television signal would not be sensed nor corrected.

A system embodying the present invention includes means for supplying a video signal which is subject to timing errors and includes a train of pulse components having a normal time interval between adjacent components. A signal processing circuit is coupled to the video signal supplying means for processing the video signal to develop an information signal which is related to the video signal pulse components. Delay means are coupled to the video signal processing circuits for delaying the signal information for a period of time which corresponds to the normal time interval between adjacent video signal pulse components. Comparator means compare the delayed and undelayed information signal to develop an error signal representative of timing errors in the video signal. Compensation means are coupled to both the comparator means and the video signal supplying means. The compensation means is responsive to the error signal and reduces timing errors in the video signal.

Figure 2:
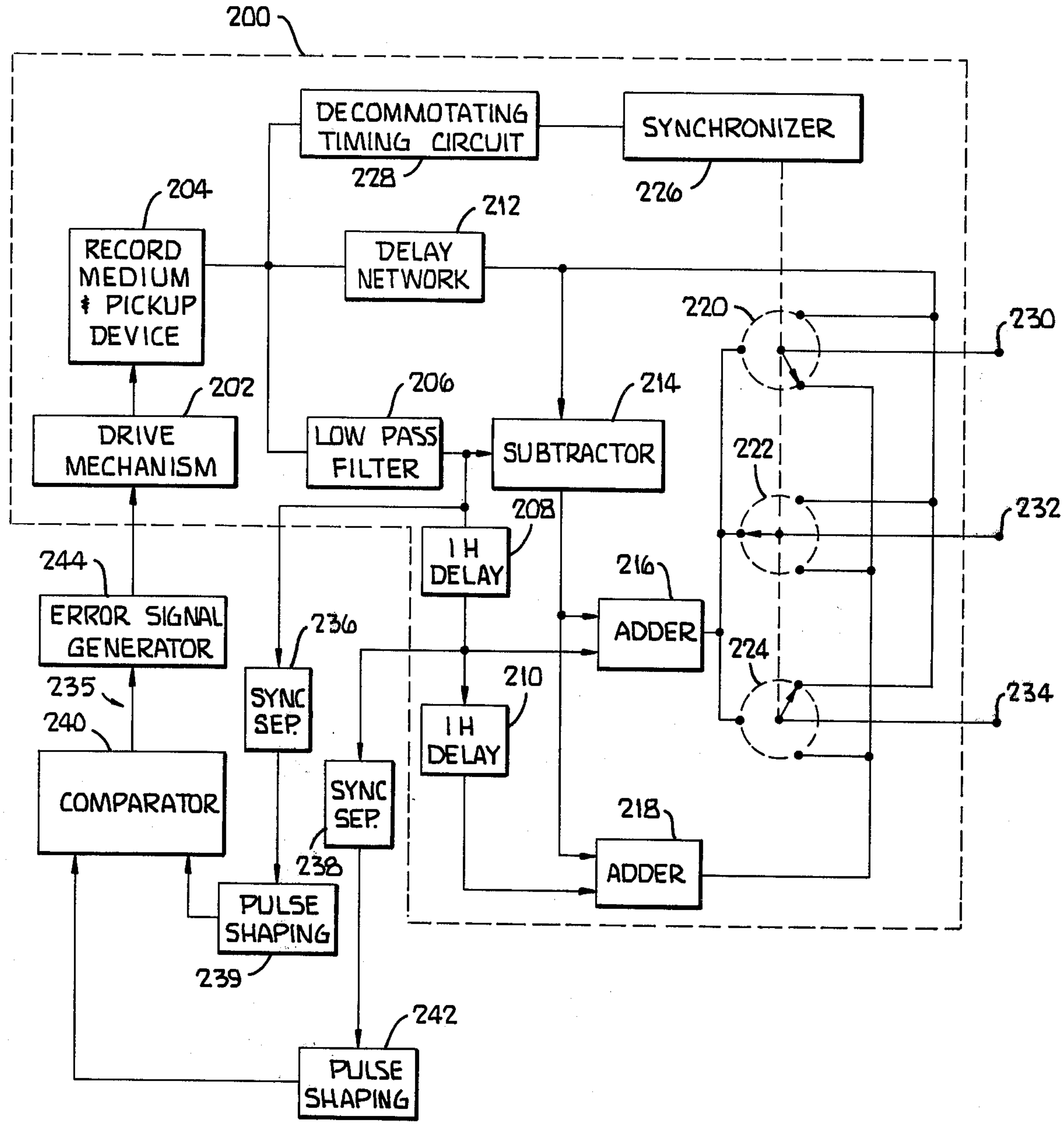

A complete understanding of the present invention may be obtained from the following detailed description of a specific embodiment thereof, when taken in conjunction with the accompanying drawings, in which:

FIG. 1 is a schematic circuit diagram, partly in block form, of a timing error detecting and speed control system embodying the present invention; and FIG. 2 is an alternate embodiment of the timing error detecting and speed control system which is particularly suitable for use with prerecorded color video signal playback systems.

Reference is now made to FIG. 1 wherein a speed error detecting and control signal generating arrangement embodying the principles of the present invention is employed, together with disc drive apparatus of a deformable belt type (as described in detail in a copending application, Ser. No. 284,509, of James C. Schoop and Frederick R. Stave, filed on Aug. 29, 1972), in a speed control system of the disc braking type disclosed in the aforesaid copending Beyers application. A continuation of said Schopp, et al. application is now issued as U.S. Pat. No. 3,873,365. A video disc record 12 is mounted on a video disc player turntable 14. The turntable is fabricated from a conductive material and is driven through a drive belt 15 and a pulley 17 by a motor 16. The motor is a synchronous motor having a synchronous speed of 3600 RPM. The diameter of the turntable 14 and the diameter of the pulley 17 are selected to provide a free running turntable speed (455 RPM) slightly above the normal operating speed (449.55 RPM) of the turntable. A suitable drive motor for the player is the synchronous motor shown in a U.S. patent application, Ser. No. 240,037, filed Mar. 31, 1972, for John Allen Tourtellot and Frederick Roland Stave and entitled, "AC MOTOR". The patent application, now U.S. Pat. No. 3,848,146, is assigned to RCA Corporation. It should be noted that the number of laminations in the rotor and stator sections of the synchronous motor are selected to give the desired motor torque. A braking system 18 slows the speed of rotation of the turntable 14 to compensate for the overdrive of the turntable by the motor 16.

A video disc pickup device 20 engages the video disc record 12. When relative motion is established between the record 12 and pickup device 20, prerecorded video information from the disc 12 is detected and applied to terminal 22 of the playback system signal processing circuits 24. The signal processing circuits 24 process the signals applied to the terminal 22 to develop a composite video signal including synchronizing pulse components at the signal processing circuits output terminal 26. A video disc system and suitable signal processing circuits are disclosed in U.S. patent application Ser. No. 126,772, filed Mar. 22, 1971, now U.S. Pat. No. 3,842,194, for Jon Kaufman Clemens and entitled, "INFORMATION RECORDS AND RECORDING PLAYBACK SYSTEMS THEREFOR," and in another U.S. patent application Ser. No. 126,678, filed Mar. 22, 1971, and now U.S. Pat. No. 3,783,196, for Thomas Osborne Stanley and entitled, "HIGH-DENSITY INFORMATION RECORDS AND PLAYBACK APPARATUS THEREFOR." Both applications are assigned to the RCA Corporation.

The composite video signal developed at the terminal 26 is applied via a terminal 28 to the video signal processing circuits of a television receiver 30. If desired, the composite video signal developed at the terminal 26 may be modulated onto a carrier signal and applied to the antenna terminals, not shown, of the television receiver 30. The composite video signal at the terminal 26 is coupled by a lead 32 to terminal 34 of a sync separator stage 36. The sync separator stage 36 and other related circuitry provide signal information which recurs at the horizontal line scanning rate of the recovered composite video signal. The signal information is applied to a delay line to delay the signal information for a period of time corresponding to the normal duration of one horizontal line of the video signal. An error signal, which is applied to the braking mechanism 18, is generated by a comparison of the delayed and undelayed signal information. The braking mechanism 18 reduces the speed of the turntable 14 and adjusts the speed of the relative motion between the video disc 12 and the pickup device 20 to reduce timing errors in the recovered video signal.

The terminal 34 is coupled by a resistor 35 and capacitor 37 to a differential amplifier stage 38. The differential amplifier stage 38 may be an integrated circuit type CA 3028A sold by the RCA Corporation. The integrated circuit is described in an RCA publication entitled. "Linear Integrated Circuits, File No. 400", which may be obtained from RCA Electronic Components, Harrison, N.J. The differential amplifier stage 38 is biased to operate in a non-linear region. Bias resistors 40, 42, 44, 46 and 48 apply an operating potential to the differential amplifier from a terminal 50 which is adapted to be energized by a +15 volt DC supply. The terminal 50 is bypassed for signal frequencies by a capacitor 56. External load resistors 52 and 54 for the differential amplifier are coupled between the terminal 50 and the integrated circuit.

The output signal from the differential amplifier stage 38 is applied to an emitter follower stage 58. The voltage waveforms at the terminal 34, the input to the sync separator 36, and at the emitter electrode of the emitter follower stage 58 are shown. As is apparent, the composite video signal applied to the terminal 34 is amplified in a non-linear manner with the negative components of the signals (the synchronizing pulse components) amplified to a greater extent than less negative and positive components. The emitter follower stage 58 is connected through a low pass filter 60 including resistors 62 and 64 and capacitors 66 and 68 to the base electrode of a sync separator transistor 70. Resistors 72 and 74 bias transistor 70 to its threshold of conduction. The negative going sync pulses cause the transistor to be biased heavily into conduction and a voltage is established across the resistor 76.

The voltage waveform at the collector electrode of transistor 70 is shown adjacent the device. The synchronizing pulse components are applied through a blocking diode 78 to an integrator circuit including the resistors 80 and 82 and the capacitor 84. The integrating circuit prevents transient voltage having a duration of less than approximately five microseconds (the duration of a horizontal synchronizing pulse) from biasing transistor 86 into conduction. When the voltage across resistor 82 and capacitor 84 reaches a level that biases transistor 86 into conduction, the voltage at the junction of resistors 88 and 90 drops toward ground potential and actuates a one shot multivibrator 92.

The one shot multivibrator 92 provides a negative going output pulse having a 45 microsecond duration. As a result, during the vertical blanking interval, when equalizing pulse components are applied to the sync separator input terminal 34, they do not affect the operation of the system. Specifically, the equalizing pulse components are applied to terminal 34 approximately every 31 ½ microseconds during the vertical blanking interval. The first equalizing pulse actuates the one shot multivibrator 92 and the next equalizing pulse occurs after the multivibrator has been actuated and during a 45 microsecond output pulse. The second equalizing pulse has no effect on the multivibrator and does not initiate another output pulse from the multivibrator.

The output signal of the one shot multivibrator 92 is applied to another one shot multivibrator 94. Multivibrator 94, when actuated, provides a negative going output pulse having a five microsecond duration. This generates a train of pulses which corresponds in duration and timing to the horizontal synchronizing pulse components contained in the input signal applied to terminal 34. Multivibrators 92 and 94 increase the reliability of the system by preventing spurious signal information from being supplied to the remaining portion of the system.

Output pulses from the sync separator stage 36 are applied over a lead 98 and capacitor 99 to the base electrode of a normally conducting transistor 100. Operating potential for the transistor is obtained from the +15 volt DC supply at terminal 50 through resistors 101 and 103. The pulses periodically bias transistor 100 out of conduction. The positive voltage pulses which develop at the collector electrode of transistor 100 are applied to the base electrode of transistor 102 through capacitor 105. Resistor 107 allows transistor 102 to be normally conducting. The resulting pulse at the junction of capacitor 105 and resistor 107 biases the normally conducting transistor 102 out of conduction thereby interrupting the current flow to ground from terminal 50 through resistor 109, the emitter-collector electrode current path of transistor 102, and a 3.58 MHz tuned circuit 111.

The 3.58 MHz tuned circuit 111 includes the adjustable inductor 104 and capacitor 106. A resistor 110, bypassed for signal frequencies by capacitor 108, provides a collector electrode load impedance when transistor 102 is conducting. When transistor 102 is biased out of conduction, the tuned circuit 111 is caused to ring at a 3.58 MHz frequency. When transistor 102 becomes biased for conduction again after the positive voltage at its base electrode subsides, the ringing ceases. The generated burst of 3.58 MHz signal is applied to the base electrode of an emitter-follower transistor stage 112. The output signal from the emitter-follower stage 112 is applied via a resistor 114 and capacitor 116 to a one shot multivibrator 118. The leading edge of each generated pulse of 3.58 MHz signal corresponds in timing to the leading edge of each horizontal pulse component in the video signal applied to the input terminal 34 of the sync separator stage 36. The output from the emitter-follower stage 112 is additionally applied via a resistor 120 to the input terminal 122 of a 63.5 microsecond delay line 124, often termed a "1H" delay line because the delay corresponds to the duration of one horizontal scan line of video signal information. The delay line 124 is a glass, acoustical type delay line. One suitable delay line is a DL45 delay line made by the Amperex Electronic Corporation and having a bandpass characteristic centered at 3.58 MHz.

The input impedance of the delay line 124 is tuned to 3.58 MHz by an adjustable inductor 126. Similarly, the output impedance of the delay line 124 is also tuned to 3.58 MHz by an adjustable inductor 130 coupled to the delay line output terminal 128. It should be recognized that the tuned circuit 111 is selected to be at the center frequency of the delay line 124. Should the center frequency of the delay line 124 be changed, the frequency of the tuned circuit 111 would likewise be changed to correspond to the new center frequency.

Each burst of 3.58 MHz signal is applied to the delay line input terminal 122 and is developed at the delay line output terminal 128 after a 63.5 microsecond delay. The delayed bursts of 3.58 MHz signal are applied by resistor 132 and capacitor 134 to an amplifier stage 136 including a grounded base amplifier 138 and emitter-follower amplifier 140. The amplified delayed bursts of 3.58 MHz signal are coupled through a capacitor 142 to a one shot multivibrator 144.

The output signal from both the one shot multivibrator 118, actuated by the leading edge of each undelayed burst of 3.58 MHz signal, and the one shot multivibrator 144, actuated by the leading edge of each delayed burst of 3.58 MHz signal, are applied to a comparator stage 146. The comparator stage 146 may be a bistable multivibrator which is conditionable between either of two stable states depending on which of its input terminals 148 and 150 is energized. The comparator stage 146 provides a +4 volt DC potential at its output terminal 152 when terminal 148 is energized and a ground potential at its output terminal 152 when terminal 150 is energized. Simultaneous energization of terminals 148 and 150 causes the comparator stage output terminal voltage level to remain unchanged from its preceding condition. The comparator stage provides an output signal representative of the order in which the one shot multivibrators 118 and 144 are actuated. This, in turn, is directly related to the frequency of the horizontal synchronizing pulse components of the video signal applied to the input terminal 34 of the sync separator stage 36.

When the speed of the relative motion between the video disc record 12 and pickup 20 increases, the undelayed burst of 3.58 MHz signal actuates the one shot multivibrator 118 before the delayed burst of 3.58 MHz signal actuates the multivibrator 144. It should be recognized that the delayed burst of 3.58 MHz signal is due to the immediately preceding generated burst of 3.58 MHz signal and occurred at a time before the increase in speed of the relative motion. Under this condition, the one shot multivibrator 118 provides an output signal to comparator terminal 148 slightly before the one shot multivibrator 144 provides an output signal to comparator terminal 150. The combination of signals at terminals 148 and 150 causes the potential at the comparator output terminal 152 to first rise to +4 volts and then drop to ground potential. The ground potential remains for approximately 63.5 microseconds. At that time, another burst of 3.58 MHz signal will actuate the two one shot multivibrators 118 and 144, causing signals to be applied to the comparator.

If the relative speed between the video disc record 12 and pickup 20 remains high or further increases, a burst of 3.58 MHz signal is applied to multivibrator 118 before the delayed burst of 3.58 MHz signal (previously applied to multivibrator 118) is applied to multivibrator 144 and the sequence repeats. If the speed of the relative motion between the video disc record 12 and pickup 20 has decreased such that bursts of 3.58 MHz signal are applied to the one shot multivibrators 118 and 144 simultaneously, the ground potential at the terminal 152 remains unchanged for approximately another 63.5 microseconds.

When the speed of the relative motion between the video disc record 12 and pickup device 20 decreases below the normal desired proper operating speed, the one shot multivibrator 144 is actuated by a delayed burst of 3.58 MHz signal before the one shot multivibrator 118 is actuated by a burst of 3.58 MHz signal. It should be recognized that the undelayed burst of 3.58 MHz signal is due to an output signal from the sync separator stage 36 occurring after the decrease in speed of the relative motion has occurred, while the delayed burst of 3.58 MHz signal is due to the immediately preceding generated burst of 3.58 MHz signal which occurred at a time before the decrease in speed of the relative motion. Under this condition, a signal from multivibrator 144 is applied to the comparator input terminal 150 slightly before a signal from multivibrator 118 is applied to the comparator input terminal 148. This combination of signals at terminals 148 and 150 causes the voltage at comparator output terminal 152 to first drop to ground potential and then rise to +4 volts. This positive potential remains for approximately 63.5 microseconds at which time bursts of 3.58 MHz signal are again applied to both of the two one shot multivibrators 118 and 144 causing signals to be applied to the comparator 146.

If the speed of relative motion between the video disc record 12 and pickup device 20 remains low or further decreases, a burst of 3.58 MHz signal (previously applied to multivibrator 118) is applied to multivibrator 144 before a burst of 3.58 MHz signal is applied to multivibrator 118 and the sequence is repeated. If the speed of the relative motion between the video disc record 12 and the pickup device 20 increases such that bursts of 3.58 MHz signal are applied to the one shot multivibrators 118 and 144 simultaneously, the positive potential at the terminal 152 remains unchanged for approximately another 63.5 microseconds. When the speed of the relative motion between the video disc record 12 and pickup device 20 increases above the normal desired operating speed, the system operates in the manner previously described.

The comparator 146 provides a binary output signal representative of the frequency of the horizontal synchronizing pulse components of the video signal recovered from the record medium and processed in the signal processing circuits 24. Where the frequency of these components is too great for any reason, the comparator 146 provides output signals at the terminal 152 which cause the speed of the relative motion to decrease. The decrease in the speed of the relative motion decreases the frequency of the horizontal synchronizing pulse components. On the other hand, where the frequency of the horizontal synchronizing pulse components is too low for any reason, the comparator 146 provides output signals at terminal 152 which causes the speed of the relative motion to increase. The increase in speed of the relative motion increases the frequency of the horizontal synchronizing pulse components. It should be recognized that the comparator 146 may be other than a bistable multivibrator and may be designed to provide an analog output signal at terminal 152 based on the timing of the input signals applied to the comparator input terminals 148 and 150. Appropriate circuitry would then be used following this stage to cause the analog signal to control the speed of the drive system.

The comparator output terminal 152 is connected by a diode 154 to the base electrode of a normally conducting transistor 156. The transistor 156 is biased for conduction from the source of DC potential at terminal 50 by the resistors 158 and 160. When the comparator output terminal 152 is at ground potential, transistor 156 is biased out of conduction, and when the comparator output terminal 152 is at +4 volts, transistor 156 remains biased for conduction. The collector electrode of transistor 156 is directly connected to the base electrode of a normally non-conducting transistor 164. The collector-emitter electrode current path of transistor 164 is connected in series with an iron core inductor 166 between a terminal 168 and ground. The terminal 168 is adapted to be energized by a +40 volt DC potential and is bypassed to ground for AC signals by a capacitor 170.

The iron core inductor 166 is positioned adjacent the metal video disc turntable 14 such that the metal turntable becomes a part of the magnetic flux path for the field of the iron core inductor. When current flows through the iron core inductor 166, a magnetic field is established which induces eddy currents in the metal turntable 14. The eddy currents in the metal turntable set up a magnetic field which interacts with the magnetic field of the iron core inductor 166 creating a braking force which tends to oppose the rotation of the video disc turntable 14. The magnitude of the device induced by the eddy currents is sufficient to slow the rotation of the turntable to establish the proper operating speed of the relative motion between the video disc record 12 and pickup device 20 to provide the desired horizontal synchronizing pulse component frequency of the recovered video signal.

The braking force produced by the eddy currents causes the turntable 14 to rotate at an asynchronous speed with respect to the 3600 RPM pulley rotation speed. The asynchronous operation is provided by virtue of the drive belt 15. Drive belt 15 is fabricated from an elastic material such as neoprene rubber or polyurethane and has a rectangular cross section 0.230 inch by 20 milli-inches. The belt provides a controllable, repeatable linear speed change mechanism utilizing the creep of the belt. The drive belt 15 is mounted in non-slip relation around the periphery of the pulley 17 and turntable 14 being stretched approximately 10 percent over its non-mounted inner circumference of 29.0 inches. The stretch is controlled by selecting the distance (6.188 inches) between the axis of rotation for the 1.145 inch diameter pulley 17 and 9.236 inch diameter turntable 14.

It has been found that the braking action produced by the eddy currents can reduce the turntable rotational speed from its free running speed of 455 RPM to as low as 445 RPM without introducing slippage between the drive belt 15 and either the pulley 17 or turntable 14. Because of the elastic yieldable property of the drive belt 15, the braking action causes the belt to creep. Specifically, the braking action tends to stretch the portion of the belt coming off the turntable and compress the portion of the belt coming onto the turntable without causing slippage between the drive belt and either the pulley 17 or turntable 14.

The turntable can also be caused to rotate at an asynchronous speed with respect to the pulley 17 with other types of drive means. For example, the pulley 17 and turntable 14 can be coupled by an idler wheel similar to audio phonographs, with the braking action causing slippage between either the turntable or pulley. However, it has been found that slippage type coupling between the pulley and turntable, either by means of an idler wheel or a belt, does not provide as controllable and repeatable a speed change mechanism as the creep belt coupling described above.

Where the motor 16 is an induction type motor, a slip speed exists between the speed of the rotating stator field and the rotating rotor structure. The slip speed of the motor is a function of the motor load. Consequently, the braking action produced by the eddy currents changes the motor load and thereby varies the slip speed of the motor to control the speed of rotation of the turntable. The slip speed effect of the motor 16 can be combined with the creep belt coupling drive described above.

In operation, when the comparator output terminal 152 drops to ground potential, transistor 156 is biased out of conduction which in turn biases transistor 164 for conduction. This represents a condition where the frequency of the horizontal synchronizing pulse components of the recovered video signal is above its desired level. Conduction of transistor 164 causes current to flow through the iron core inductor 166 which establishes a braking force tending to slow the rotation of the turntable 14. The rotation of the turntable 14 is slowed to the point where the frequency of the horizontal synchronizing pulse components of the recovered video signal is below the desired level. At this time, the comparator output terminal 152 rises to a positive potential, the transistor 156 is biased for conduction. This biases transistor 164 out of conduction, stopping the current flow through the iron core inductor 166 and thereby removing the braking force. With the braking force removed, the rotational speed of the turntable 14 increases toward its free running speed. When the speed reaches the point that the frequency of the horizontal synchronizing pulse components of the recovered video signal is too high, the process repeats itself. It can be seen that the rotational speed of the video disc turntable is continuously adjusted to provide the normal desired proper operating frequency for the horizontal synchronizing pulse components of the recovered video signal.

Color encoding systems for video playback systems have been proposed in which the recovered video signal is decoded by circuits which include a delay line. One color encoding system of this type is shown in U.S. Pat. No. 3,560,635 granted to Walter Bruch. For proper operation of these systems, however, it is necessary that the time interval between each horizontal scan line of the recovered video signal precisely match the delay of the delay line utilized in the decoding circuits. If the speed relationship between the record medium and pickup device causes the interval between the horizontal scan lines of the recovered video signal not to match the delay of the delay line, the decoding circuits will not operate properly.

Reference is now made to FIG. 2. A video playback system 200 is provided for playback of prerecorded color video signal information. The system 200 shown enclosed by a dashed line is similar to that shown and described in U.S. Pat. No. 3,560,635 granted to Walter Bruch. A drive mechanism 202 drives a record medium to establish a relative motion between the record medium and a pickup device 204. The color video signal is recorded in a line sequential manner with the color information encoded over a three line period (one color per line) as a low frequency signal (0–600 KHz). The luminance information above 600 KHz is continuously recorded on a line by line basis.

The detected prerecorded composite video signal is applied to a low pass filter 206 (0–600 KHz). Filter 206 separates the low frequency color information from the composite video signal. The output signal from the low pass filter 206 is applied to two series connected 63.5 microsecond "1H" type delay lines 208 and 210. The entire composite video signal is applied to a delay network 212 which delays the composite video signal to match the delay of the low frequency color information signal by the low pass filter 206.

The output signals from the low pass filter 206 and the delay network 212 are applied to a subtractor 214 where the low frequency color information is subtracted from the delayed composite video signal. As a result, the high frequency luminance information signal is developed at the subtractor output terminal. The high frequency luminance information signal and the delayed low frequency color information signal from the delay line 208 are summed in an adder 216. Similarly, the high frequency luminance information signal and the twice delayed low frequency color information signal from the delay line 210 are summed in an adder 218. The output signals from the adders 216 and 218, as well as the output signal from the delay network 212, are applied in parallel to each of three decommutating switches 220, 222 and 224.

A decommutating timing circuit 228 is energized by the recovered color video signal and detects synchronizing information recorded on the record medium. The synchronizing information marks the beginning of each three line sequence of color information. The decommutating timing circuit 228 controls a synchronizer 226 which is coupled to the three decommutating switches 220, 222 and 224. The decommutating switches are controlled by the synchronizer 226 to operate in synchronism with each other and with the line sequential color information signals. The decommutating switches cycle in a manner such that a signal representing only one of the three color information signals and the luminance information signal is continuously developed at the output terminal from each of the switches. Thus, a low frequency red information signal and a high frequency luminance information signal is provided at the output terminal 230 of the decommutating switch 220. A low frequency green information signal and a high frequency luminance information signal is provided at output terminal 232 of the decommutating switch 222. Finally, a low frequency blue information signal and a high frequency luminance information signal is provided at the output terminal 234 of the decommutating switch 224.

It has been discovered that the delay lines utilized in the video playback system 200 as well as signals already passing through the delay lines can be advantageously used as part of a speed control system 235 for the playback system. It will be noted that the horizontal synchronizing pulse components of the recovered video signal occur at a 15.734 KHz rate. This is within the 0–600 KHz pass band of the low pass filter 206. Consequently, the horizontal synchronizing pulse components passing through either of the delay lines 208 or 210 may be incorporated as part of a speed control system similar to the one described in FIG. 1. It should be recognized that any other signal which passes through either delay line and occurs at the horizontal line scanning rate may be utilized as the signal information for the speed control system 235.

In the embodiment of FIG. 2, the horizontal synchronizing pulse components of the recovered color video signal pass through each of the delay lines 208 and 210. The input and output of delay line 208 is connected respectively to horizontal synchronizing pulse component separator stages 236 and 238. The separated horizontal synchronizing pulse component output signal from the separator stage 236 is applied through a pulse shaping network 239 to a comparator 240. The delayed separated horizontal synchronizing pulse component output signal from the separator stage 238 is likewise applied through a pulse shaping network 242 to the comparator 240.

The comparator provides output signal information representing the frequency of the horizontal synchronizing pulse components of the recovered video signal. The comparator 240 is coupled to an error signal generator 244 which controls the drive mechanism 202. The drive mechanism is controlled by the output signal from the error generator to adjust the speed of the relative motion between the record medium and pickup to correct for the frequency variations of the horizontal synchronizing pulse components of the recovered video signal. The comparator 240, error signal generator 244 and drive mechanism 202 operate in a manner similar to the corresponding structure shown in FIG. 1 to achieve the same results.

It should be noted that many "1H" type delay lines are extremely precise and are held to tolerances that exceed the stability and lockup range of the deflection and color processing circuits of many television receivers. However, since the timing error detecting and speed control system is matched to the delay of the playback system's delay lines, the recovered color video signal will be maintained at exactly the precise frequency required for proper operation of the playback system signal processing circuits with less precise delay lines. Consequently, the present system enables lower cost delay lines to be employed in the playback system signal processing circuits without sacrificing performance.

What is claimed is:

1. In a video playback system wherein a prerecorded composite video signal is recovered from a record medium by a pickup device when relative motion is established between said record medium and said pickup device, a timing error detecting and speed control system comprising:

drive means for establishing a relative motion between said record medium and said pickup device;

means coupled to said drive means and responsive to an error signal for adjusting said drive means to control the speed of said relative motion;

signal processing circuits coupled to said pickup device including means for deriving signal information from said composite video signal which nominally recurs at the desired horizontal line scanning rate of said composite video signal;

means coupled to said deriving means for delaying said signal information for a period of time corresponding to one horizontal period at the desired horizontal line scanning rate;

error signal generating means coupled to said delay means for developing an error signal by comparison of said delayed and undelayed signal information, said error signal being representative of the deviation of said signal information recurrence rate from said desired horizontal line scanning rate; and means for applying said error signal to said adjusting means such that said adjusting means adjusts said drive means to cause the speed of said relative motion to change in a direction tending to reduce the deviation of said signal information recurrence rate from said desired horizontal line scanning rate;

wherein said error signal generating means comprises a bistable multivibrator, having a pair of input terminals and an output terminal, and subject to operation in either of two stable states;

wherein said error signal generating means also includes first pulse generating means coupled to said recurring signal information deriving means and responsive to said undelayed signal information for developing a trigger pulse in response to each appearance of said recurring signal information at the output of said deriving means, and second pulse generating means coupled to said delaying means and responsive to said delayed signal information for developing a trigger pulse in response to each appearance of said recurring signal information at the output of said delaying means;

wherein said error signal generating means further includes means for applying the trigger pulse output of said first pulse generating means to a first of said pair of multivibrator input terminals, and means for applying the trigger pulse output of said second pulse generating means to a second of said pair of multivibrator input terminals; said multivibrator being subject to switching to one stable state when trigger pulse appearance at said first multivibrator input terminal occurs during pulse absence at said second input terminal and under conditions of multivibrator operation in the other stable state, and being subject to switching to said other stable state when trigger pulse appearance at said second multivibrator input terminal occurs during pulse absence at said first input terminal and under conditions of multivibrator operation in said one state; and wherein said adjusting means is coupled to said output terminal, and comprises braking means subject to energization only when said multivibrator is in said other of said two stable states.

2. A timing error detecting and speed control system in accordance with claim 1:

wherein said delaying means comprises an acoustic delay line having a bandpass characteristic;

wherein said recurring signal information deriving means comprises means for separating recurring horizontal synchronizing pulse components from said composite video signal, and means responsive to the pulse output of said separating means for generating bursts of oscillations of a frequency falling within the passband of said acoustic delay line, said generated bursts recurring at a rate substantially matching the recurrence rate of said separated synchronizing pulse components, and the output of said burst generating means being applied to the input of said acoustic delay line; and wherein said first pulse generating means is coupled to the output of said burst generating means to respond to an undelayed version of said generated bursts, and said second pulse generating means is coupled to the output of said acoustic delay line to respond to a delayed version of said generated bursts.

* * * * *